United States Patent [19]
Johnson

[11] Patent Number: 5,076,827
[45] Date of Patent: Dec. 31, 1991

[54] METHOD AND APPARATUS FOR COMPOSTING USING IMPROVED CHARGING AND DISCHARGING SEQUENCE

[75] Inventor: Richard P. Johnson, Kingwood, Tex.

[73] Assignee: Ashbrook-Simon-Hartley Corporation, Houston, Tex.

[21] Appl. No.: 439,692

[22] Filed: Oct. 30, 1989

[51] Int. Cl.$^5$ ............................................... C05F 11/08
[52] U.S. Cl. ............................................. 71/9; 71/8; 71/10; 422/184
[58] Field of Search ..................... 71/8, 9, 10; 422/184

[56] References Cited

U.S. PATENT DOCUMENTS

| | | | |
|---|---|---|---|
| 3,756,784 | 9/1973 | Pittwood | 23/259.1 |
| 4,384,877 | 5/1983 | Nemetz | 71/9 |
| 4,436,817 | 3/1984 | Nemetz | 435/313 |
| 4,798,802 | 1/1989 | Ryan | 71/9 X |

FOREIGN PATENT DOCUMENTS

| | | |
|---|---|---|
| 2060596 | 5/1981 | United Kingdom. |
| WO90/01473 | 2/1990 | World Int. Prop. O. . |

*Primary Examiner*—Ferris H. Lander
*Attorney, Agent, or Firm*—Foley & Lardner

[57] ABSTRACT

A method and apparatus is disclosed for composting of organic matter. A ram advances the entire mass of organic matter within the composting chamber to create an evacuated space in the composting chamber, which evacuated space is of substantially greater volume than the volume of an incremental inlet space. The incremental inlet space is a space in the composting chamber defined by a projection of an inlet opening into the composting chamber. After the creation of the evacuated space, a new charge of organic matter is fed through the inlet opening. The ram then moves this new charge of organic matter into the evacuated space in the chamber to join the existing mass of organic matter already in the chamber. The ram also lightly compresses the new charge to a predetermined density or porosity. Typically, the extent of compressive force applied to the new charge is less than that required to move the entire mass of organic matter through the chamber. In this way, the new charge remains sufficiently porous and uncompacted so as to facilitate drying with air which is circulated through the chamber. Once the new charge is sufficiently dry, the entire mass of organic matter may then be moved by the ram to create a new evacuated space in the chamber.

4 Claims, 2 Drawing Sheets

FIG. 2
PRIOR SYSTEM

METHOD AND APPARATUS FOR COMPOSTING USING IMPROVED CHARGING AND DISCHARGING SEQUENCE

BACKGROUND OF THE INVENTION

1. Field of the Invention

This invention relates to an improved method and apparatus for aerobic composting.

2. Discussion of the Prior Art

It is known to compost organic waste material, such as sludge from a waste water treatment facility, utilizing mechanical composting bins or vessels which circulate aeration air through the organic matter to be composted. The goal is to produce a non-malodorous organic material which can often be sold as a soil amendment or soil conditioner and which is at least not costly or objectionable to dispose of. The composting will also tend to reduce the amount of water in the organic matter, resulting in drying of the material to further alleviate disposal problems.

A commonly used approach to composting involves static or semi-static techniques in which the material to be composed is deposited in heaps or in pits or troughs in the surrounding terrain. Such approaches, are slow, require a considerable amount of land, may be environmentally dangerous and undesirable and tend to be uneconomical. To speed up the composting and to reduce size of the site required, various mechanical composting systems have been proposed.

One frequent approach to mechanical composting has involved the use of upright, cylindrical devices in the nature of silos, through which pressurized aeration air is circulated to aid in the decomposition process. Such vertical silos have certain disadvantages, such as excessive compaction of lower layers of material which have been vertically stacked as well as complicated internal mechanical equipment with high maintenance and downtime requirements due to the corrosive environment.

Horizontal composting methods and equipment have been proposed as alternatives to vertical composting silos. Horizontal composting has the advantage of a simple construction in which organic matter is moved horizontally along the length of the composting vessel in a stepwise fashion with the use of a hydraulically actuated ram. Each step consists of moving organic matter from the inlet against the entire mass of organic matter in the vessel, thereby moving the entire mass and discharging an amount of organic matter approximately equal to the amount of organic matter moved from the inlet into the composting chamber. The inlet is then again fed or charged with organic matter until full. Aeration air is circulated through the horizontal vessel to aid in carrying out the composting process in a relatively short period of time. Such a method and such an apparatus are disclosed in U.S. Pat. Nos. 4,384,877 and 4,436,817 to Nemetz, which U.S. Patents are hereby incorporated herein by reference.

Although horizontal composting has represented a substantial advance in the art, a greater flexibility in charging and discharging of the composter is desired. For example, it would be advantageous to accommodate charges of varying size and varying amounts of organic matter to be composted. Specifically, after a weekend during which composting has taken place, an amount of composted organic matter would be accumulated in the composting vessel which is larger than the normal weekday amount. The system described in the foregoing Nemetz patents can only charge and discharge an amount of organic matter which is approximately equal to the volume of the inlet or, more precisely, a space in the composting chamber representing a projection of the inlet opening into the composting Chamber. Thus, such a system affords no flexibility in charging and discharging.

Also, the method described by Nemetz requires the entire mass to be moved at every charging, thereby increasing energy costs. Further, each charging results in a discharge which requires manpower to monitor and to dispose of. Additionally, in the method and apparatus of the foregoing Nemetz patents, the density of the charge of organic matter is determined by the force required to compress the charge and move the entire mass.

A problem occurs in this known horizontal composting system where, as is often the case, material introduced into the composting chamber is relatively wet. Wet organic matter is heavy, thus requiring a large ram force in order to move the material. Force applied to the wet organic matter tends to be transmitted in all directions in a manner similar to that of a pressurized hydraulic fluid in a chamber. Force transmitted to the walls of the composting chamber in this way increases the frictional resistance of the wet charge to movement, causing the charge to bind in the chamber.

The problem compounds itself, because the large force on the ram applied to counter the resistance to movement compresses the organic matter further, making it heavier, more dense, and less porous, i.e. less able to permit the flow of aeration air through the organic matter. Air flow through the organic matter is essential for drying of the wet charge and for composting via aerobic decomposition. In the process of this aerobic decomposition, the moisture content of the material decreases, i.e. the material becomes dryer. It also becomes more porous, lighter, and easier to move through the composting vessel.

High moisture content in the material introduced into the composting vessel inhibits aerobic decomposition, inhibits air drying by circulation of air through the charge, increases the power demands and strength requirements of the equipment, increases the compaction of the organic matter and further inhibits the flow of air through the organic matter. In extreme cases, the high ram force required to move such highly compacted material through the vessel can cause equipment failures. In addition, the inhibition of air flow through the new charge of relatively wet organic matter requires increased pressures in the aeration air and increased pressure drops along the flow path of the aeration air. These pressure drops occur between air flowing into the composting chamber and air flowing out of the chamber after passing through the organic matter. The pressure drops necessitate increased aeration air pressures. Increased pressures, in turn, result in increased temperatures. With increased temperatures, the optimum temperature range for aerobic decomposition may be exceeded, thus further inhibiting the composting process.

Accordingly, it is an object of this invention to provide a system for composting organic matter which permits flexibility in the charging and discharging function.

It is a further object of the invention to better control the density, and thus the temperature, moisture content, and porosity of the mass of organic matter in the composter, particularly the density, temperature, moisture content and porosity of the new charge of organic matter in the critical first part of the composting vessel.

It is a further object of the present invention to provide a composting system in which excessive compaction of the organic matter in the composting chamber, particularly the critical first part of the composting chamber which receives the new charge, is avoided.

It is yet another object of the present invention to provide a composting system in which the density and porosity of the organic matter in the composting chamber, particularly the new charge of material in the first part of the composting chamber, may be controlled and maintained within an optimum range for composting a particular organic matter and for movement of the mass of organic matter through the composting vessel.

It is a further object of the present invention to provide a composting system in which the power requirements for the movement of the organic mass through the composter are reduced.

It is a related object of the present invention to provide a composting system in which the strength of the components of the composting apparatus may be less than of that of known systems.

It is a further object of the present invention to provide a composting system which ensures that aeration air may be circulated to an adequate extent through a new charge of relatively wet organic matter which has been introduced into a composting vessel.

It is still a further object of the present invention to provide a composting system which ensures that a new charge of relatively wet organic matter will not become excessively compacted as a result of its resistance to movement through the composting vessel.

It is another object of the present invention to provide a composting system in which the force required to move the entire mass of organic matter through the composting chamber will not have to be exerted through a new charge of relatively wet organic matter until that organic matter has been subject to air drying and initial aerobic decomposition to render the charge dryer, lighter, and more readily amenable to movement through the composting vessel.

It is yet another object of the present invention to provide a composting system in which the temperature of a new charge of relatively wet organic matter and the temperature of the aeration air circulating therethrough may be controlled by control of the extent of compaction of such new charge.

It is a further object of the present invention to provide a composting system in which the moisture content of a new charge of material in the composting chamber may be controlled by controlling the extent of compression of such organic matter by the ram.

It is a further object of the present invention to provide a composting system in which the extent of compaction of a new charge of material in the composting chamber is not governed by the amount of force required to move the entire mass of organic matter through the composting chamber.

It is yet another object of the present invention to provide a composting system in which the force exerted on the entire mass of organic matter in the composting chamber will be generally linearly and longitudinally transmitted through the entire mass to move the entire mass and in which such force will not be transmitted to a substantial extent to the walls of the chamber through a relatively wet new charge in the first part of the composting chamber.

It is a further object of the present invention to provide a composting system in which an existing mass of organic matter already in the composting chamber may be advanced toward the outlet opening of the composting vessel prior to any engagement of the existing mass of organic matter by a new charge of organic matter and in which new charges of organic matter are joined with the existing mass organic matter in operational steps which are carried out separately from such advancing of the entire mass.

It is a further object of the present invention to provide a composting system in which an evacuated space may be created in the composting chamber, which evacuated space is of substantially greater volume than the volume of an incremental inlet space, the incremental inlet space being defined by the projection of the inlet opening into the composting chamber.

It is yet another object of the present invention to provide a composting system in which the amount of discharged organic matter may be of substantially greater volume than the volume of the incremental inlet space.

It is a further object of the present invention to provide a composting system, which, while capable of providing an evacuated space and a discharge amount—both of which are of substantially greater volume than the volume of the incremental inlet space for handling relatively large amounts of organic matter—is not limited to handling such amounts and may provide for the creation of smaller spaces and smaller discharge amounts.

It is yet another object of the present invention to provide a composting system of the kind utilizing a ram for advancing organic material through the composting vessel in which it is not necessary to fully retract the ram in order to introduce a new charge of organic matter into the composting chamber of the vessel.

It is yet another object of the present invention to provide a composting system in which new charges of organic matter may be introduced into the composting vessels at various different positions in the composting chamber.

It is a further object of this invention to accomplish the above objects efficiently and inexpensively.

Other objects and advantages of this invention will become apparent from the specification and drawings which follow.

SUMMARY OF THE INVENTION

The foregoing and additional objects are obtained by a composting method and composting apparatus according to the present invention.

The invention utilizes a composting chamber with an inlet and outlet located at opposite ends. However, the usual system involving the steps of depositing a determined amount of organic matter in the inlet of the chamber and exerting via a ram a compressive force on this amount and thereby moving the organic matter through the chamber in a stepwise fashion is not used.

Rather, the ram first advances the entire mass of organic matter in the composting chamber to create an evacuated space, which evacuated space is from one percent to twenty percent of the length of the horizontal vessel. Organic matter of a volume approximately equal to the evacuated space is thereby discharged at the outlet. When relatively large new charges of organic matter need to be added, or when relatively large amounts of organic matter have been fully composted and are ready for discharge, the evacuated space created by the advance of the organic matter in the vessel and the consequent discharge of some of that matter will be relatively large. That is, an evacuated space may be created which is of substantially greater volume than what will be termed the "incremental inlet space." Such incremental inlet space is the space defined by a projection of the inlet opening vessel into the composting chamber within the vessel. It will be apparent that creation of an evacuated space of relatively large size will result in a corresponding discharge of organic matter of substantially greater volume than the volume of the incremental inlet space.

Next, after creation of the evacuated space and after retraction of the ram, organic matter is fed into the vessel via the inlet opening. The ram then moves this new charge of organic matter through the evacuated space of the composting chamber until contacting the mass of organic matter already present in the chamber. The ram lightly compresses the new charge until a preset compression is reached. The extent of compression will depend primarily upon the amount of moisture in the new charge. The wetter the material, the less the extent of compression and the more the new charge is to be dried before being advanced further by the ram.

The feeding and advancing steps are repeated until the evacuated space is filled. Once full, the mass, and in particular the new charge, is allowed to rest for a predetermined period of time. Then the ram is advanced forward to push the entire mass toward the outlet with a long stroke which also creates a new evacuated space. The process may then be repeated using the same steps to fill a new, selected, evacuated space volume.

In the present invention, a longer than conventional ram stroke may be used. The ram stroke of the conventional system extends only through the incremental inlet space. The present invention provides a ram stroke which may extend through the incremental inlet space and into the evacuated space for one percent to twenty percent of the length of the horizontal vessel, i.e. one percent to twenty percent more than the length occupied by the incremental inlet space. The ram advances the entire mass the desired distance while discharging part of the mass. The ram then moves another newly fed mass, i.e. a first new charge, up to this advanced mass of organic matter. Various additional new charges after the first new charge may be added without first moving the entire mass through the chamber. After a waiting period, the entire mass, including the new charges may be moved through the chamber to make room for yet newer charges. This flexibility of ram actuation allows the present invention to achieve greater flexibility of charging and discharging and to control the density and thus the porosity (which in turn controls the temperature and moisture content) in the very important first part of the composting vessel, i.e. the part where the new charges are introduced.

When a first new charge of organic matter is moved into the evacuated space to join the existing mass of organic material already in the composting chamber, this new charge is compressed until a predetermined compression of the new charge is achieved. The predetermined compression will be light enough to avoid heavy compaction of the new charge and to maintain a light enough density and a sufficient porosity to facilitate circulation of aeration air through the new charge. After several new charges are lightly compressed in this matter, they are held in place under the relatively light compressive force of the ram for a period of time while aeration air is circulated through the new charges. This continues until the new charges reach a predetermined moisture content, i.e. a predetermined dryness. The predetermined dryness will be the point of dryness at which the new charges may accept a force of the ram which will be transmitted linearly and longitudinally through the entire mass of material to move the entire mass. Thus, the ram force is not diverted against the walls of the composting chamber. This avoids an increase in the friction between the mass of organic matter and the chamber and avoids a further increase in the force required to move the entire mass through the chamber.

The holding of the new charges of relatively wet organic matter in place during a waiting period under a light compressive force prior to advancing the entire mass through the chamber, which waiting period represents a holding stage, also may involve monitoring of the temperature of the new charges. As previously indicated, the greater the compaction of the organic matter, the greater is the temperature of the aeration air and of the organic matter itself. As the temperature rises to an excessive level, aerobic decomposition may cease.

Thus, the invention involves targeting an optimum range of temperatures in the new charges for optimizing aerobic decomposition. The temperature monitoring preferably takes place throughout the holding stage until there has been a sufficient moisture reduction to facilitate further processing by movement of the entire mass of organic matter, including the new charges, through the composting chamber. This temperature monitoring operation entails monitoring, maintaining and, if necessary, adjusting the compression on the new charges of organic matter so as to provide a given density and porosity in the new charges, which, in turn, controls the temperature to keep the temperature within the optimum range.

This same approach is used to bring the moisture content of the new charge to a sufficiently low level within an aimed-for range to facilitate further processing.

While the present invention encompasses composting systems in which the organic matter may be moved or advanced through the composting vessel by an arrangement other than a ram at the inlet end of the vessel, a particular preferred embodiment of the invention disclosed herein utilizes such a ram, which ram performs multiple roles.

The ram advances the entire existing mass of organic matter in the composting chamber through the composting chamber toward the outlet to create the evacuated space in the chamber, such advance being effected by a first displacement of the ram. Nevertheless, a conveyor system or other means for advancing the organic matter could be used.

The ram also moves new charges of organic matter into the evacuated space to join the existing mass of organic matter, which ram movement is separate from that of advancing the existing mass, this additional movement being a second displacement. The second displacement follows a retraction of the ram to allow a new charge of organic matter to be deposited in front of the ram by a feeding operation. Typically, there will be a series of these second types of displacements, corresponding to a series of new charges, before there is another displacement of the first type. In order to minimize the movements of the ram, particularly where the ram is in an extended position, the use of multiple inlet openings or a moveable inlet opening is possible. In this way, the ram need not be fully retracted for each new charge of organic matter to be fed into a relatively large evacuated space.

The ram also serves to maintain an adjustable compressive force on the new charges of organic matter until a predetermined compression of the new charges is achieved. This adjustable compressive force adjusts the porosity and density of the new charges, which in turn, adjust the temperature and ultimately the moisture content thereof.

DETAILED DESCRIPTION

In the following description, and in the accompanying drawing, like reference numerals, as used among the various figures of the drawing, refer to like features or elements among the various figures.

Referring to FIGS. 1-4, composting apparatus 10 includes a hollow vessel 12 defined by walls 14. Among the walls 14 is a floor 16. Walls 14 define a composting chamber 20 within vessel 12. As will be seen from the drawings, vessel 12 and its internal composting chamber 20 are elongated so as to take the form of a conduit.

Figure 1:
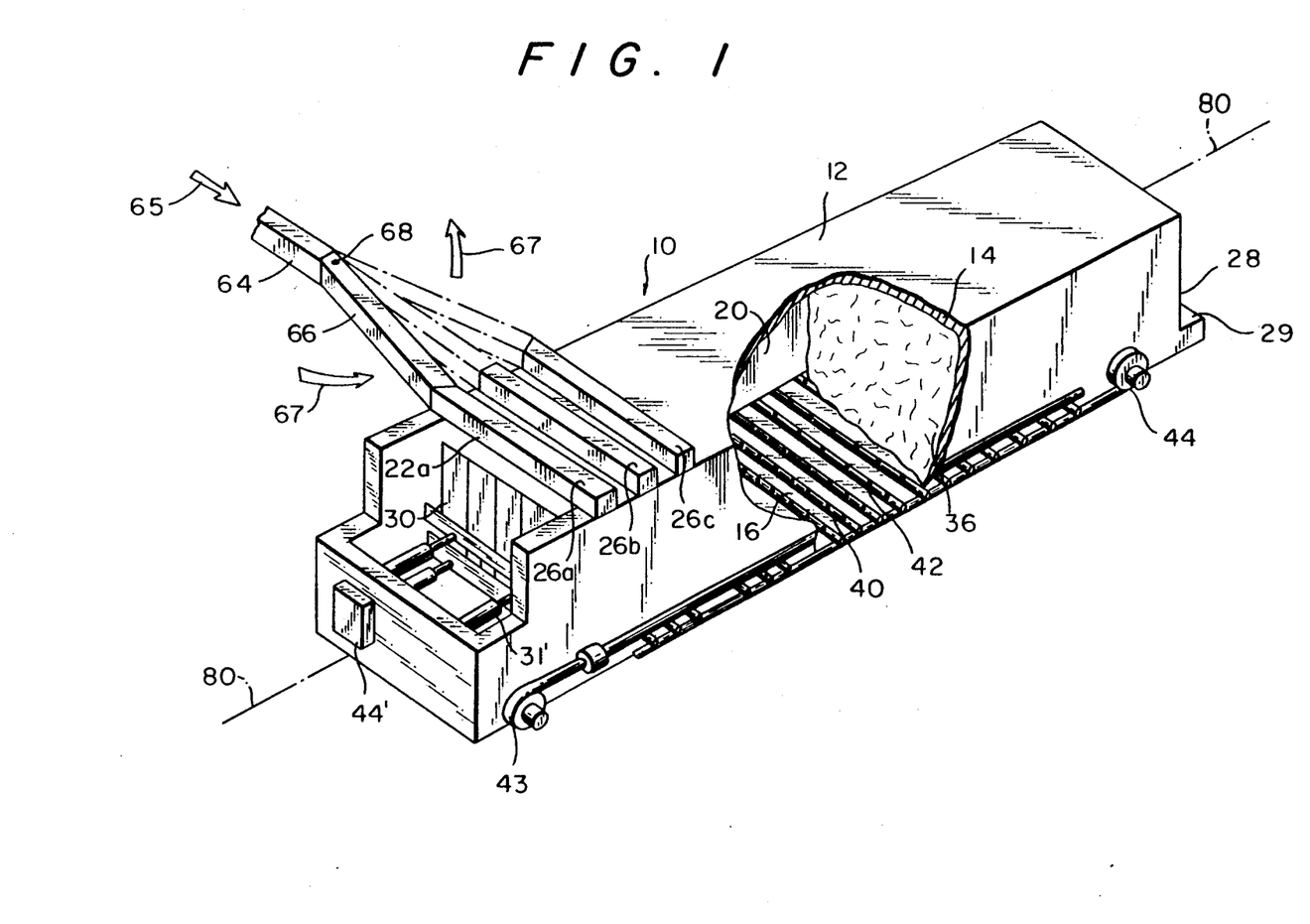
FIG. 1 is a perspective view, partly cut away, of a composting apparatus according to the present invention and for carrying out the method of the present invention, which apparatus and method utilize a plurality of inlet openings.
Figure 2:
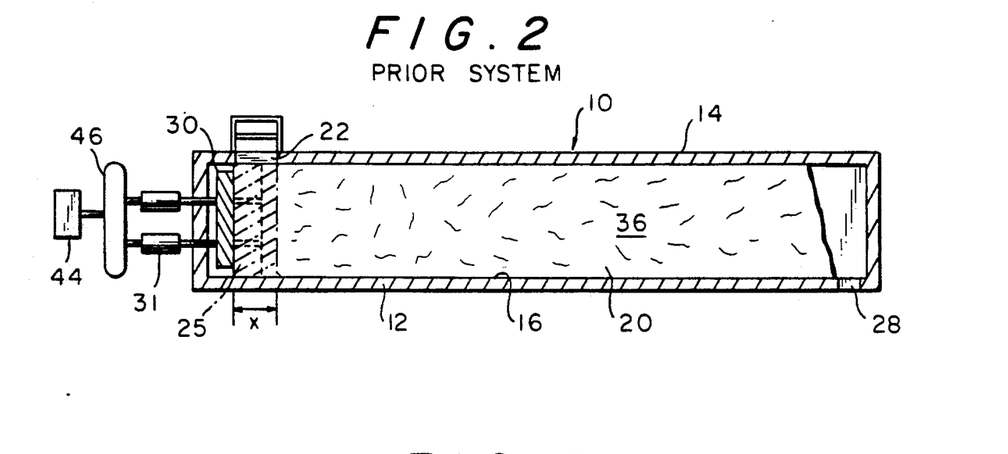
FIG. 2 is a view in vertical section of a composting apparatus for carrying out a known method of composting.
Figure 3:
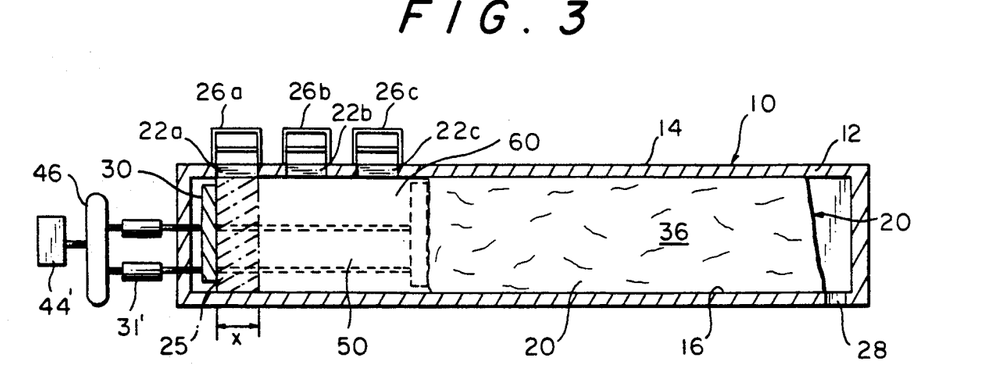
FIG. 3 is a view in vertical section of a composting apparatus generally of the type shown in FIG. 1.
Figure 4:
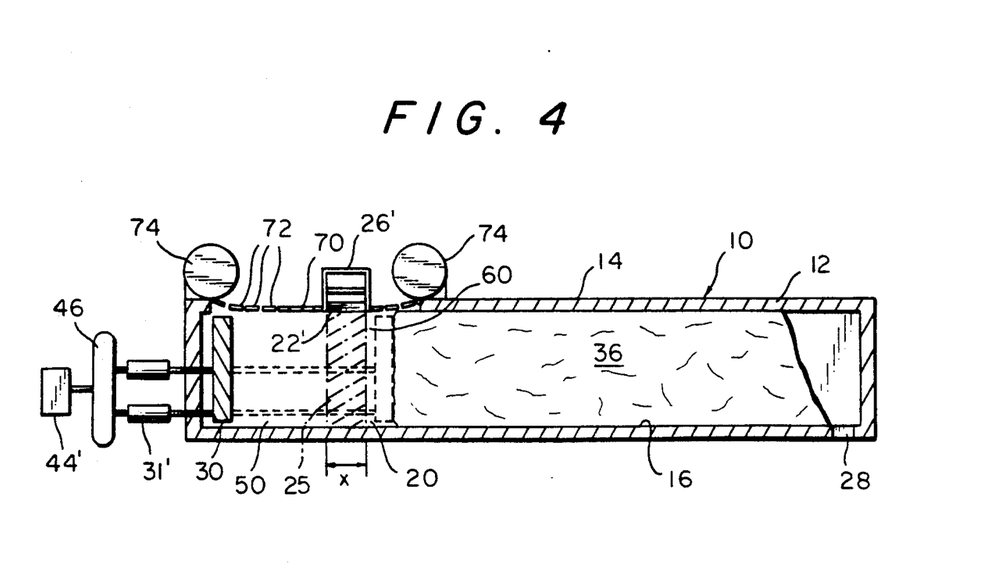
FIG. 4 is a view in vertical section of a composting apparatus according to the present invention and for carrying out the method of the present invention which utilizes a moveable inlet opening.

At one end of vessel 12 is an inlet 22. In the embodiments of FIGS. 1 and 3 three inlet openings 22a, 22b, 22c are used, as will be further described. In the embodiment of FIG. 4, a moveable inlet opening 22' is used, as will also be further described. FIG. 2, which depicts a conventional system, utilizes a single, fixed inlet opening 22. For the moment, all of these inlet openings will generally be referred to simply as "inlet opening 22."

Inlet opening 22 co-operates with infeed conveyor 26 to permit communication between the exterior and interior of composting chamber 20 within vessel 12. Again infeed conveyor 26 may take various forms in different embodiments, including the three infeed conveyors 26a, 26b, 26c of FIGS. 1 and 3 and the moveable infeed conveyor 26' of FIG. 4.

At the end of vessel 12 opposite inlet opening 22 is an outlet opening 28 which cooperates with an outfeed conveyor 29. Outlet 28, in conjunction with outfeed conveyor 29, permits communication between the interior and exterior of composting chamber 20. A ram 30 is located within composting chamber 20 adjacent inlet 22. Ram 30 is driven by one or more hydraulic cylinders 31.

Distributed over the floor 16 of vessel 12 are a set of floor mounted orifices 42 which are located along virtually the entire length of vessel 12. These orifices 42 communicate with the chamber 20 of vessel 12 and with sources 43 of pressurized air and/or suction. Orifices 42 permit pressurized air, or a pattern of pressurized air and suction, to cause aeration air to be circulated through composting chamber 20. This air circulation, which is known in the art, provides for aeration of the organic matter 36 to speed aerobic decomposition of organic matter 36 and thus facilitate and accelerate composting.

Referring now to FIG. 2, the currently known apparatus and method for operating composting apparatus 10 is shown. Distance x between the retracted position of ram 30 as shown in solid lines and the fully advanced position as shown in phantom lines represents the lengthwise dimension of the space which will accommodate one charge of organic matter 36 fed into incremental inlet space 25 via inlet opening 22 during one conventional charging operation.

Incremental inlet space 25 is a space defined by a projection of inlet opening 22 into composting chamber 20. It represents the increment of space which would be filled with a new charge of organic matter if the ram were moveable only from the downstream edge of inlet opening 22 to the upstream edge of inlet opening 22, as is the case in the conventional system as shown in FIG. 2. Such incremental inlet space is the amount of space available to receive a new charge of organic matter in the conventional system of FIG. 2. Such incremental inlet space 25 can be considered the space defined by moving the rectangular area of inlet 22 in a rectilinear manner from the top wall of vessel 12 to the bottom wall thereof to create a three dimensional space. Such incremental inlet space 25 is shown by crossed hatched phantom lines in FIGS. 2, 3 and 4. In the multiple inlet embodiment of FIG. 3, incremental inlet space 25 is the space defined by the projection of only one of the three inlet openings into the composting chamber. There, incremental inlet space 25 is shown as being the space defined by the projection of the first of the three inlet openings 22a into the composting chamber.

In the conventional system of FIG. 2, incremental inlet space 25 also happens to be the space defined between the front face of ram 30 in the retracted position and the front face of ram 30 in the fully advanced position, when hydraulic cylinders 31 are fully extended as shown in phantom lines. After the ram is retracted, the downstream end of the incremental inlet space 25 is also defined by the wall of organic matter formed by the ram in the conventional system. The distance "x" corresponds to the size of the conventional inlet opening 22 as measured in the direction of ram travel.

Still referring to FIG. 2 and with continued reference to the prior system, after the infeed operation and after advance of ram 30 as shown in phantom lines in FIG. 2, ram 30 is retracted to the solid line position shown in FIG. 2 in preparation for the next infeed operation. Ram 30 is advanced and retracted by hydraulic cylinders 31. Hydraulic cylinders 31 are controlled by conventional control system 44 which controls the amount of hydraulic fluid which flows from hydraulic fluid supply source 46 to cylinders 31.

Thus, in the prior system, ram 30 moves through a relatively short stroke. In this way organic matter 36 deposited in the incremental inlet space 25 may be moved stepwise through the chamber 20 and discharged at the outlet 28 as a result of each successive charge of organic matter 36 pushing the preceding charge forward through the vessel 12 by the action of ram 30.

This prior system limits charging and discharging flexibility and results in more manpower and energy costs than can be achieved by use of the present invention. In the prior system, the volume of the charge is set by the volume of incremental inlet space 25. Thus, the amount of organic matter 36 to be discharged is limited to the volume of that space. Also, each charging necessitates the moving of the entire mass of organic matter 36 through composting chamber 20 before another charging may take place. Further, each charging results in a discharge of organic matter 36 at outlet 28. This discharge requires manpower to monitor and dispose of the discharged organic matter.

Referring now to FIGS. 1 and 3, an embodiment of the present invention is shown. First, ram 30 is advanced from a retracted position for a desired distance against organic matter 36 through a stroke which is substantially longer than a conventional stroke, thereby moving organic matter 36 toward outlet 28 and creating an evacuated space 50 which runs for a considerably greater distance than distance x, which represents the length of the incremental inlet space 25 in the conventional system of FIG. 2. The retracted position of ram 30 is shown by solid lines and the advanced position by phantom lines in FIG. 3.

Hydraulic cylinders 31' of the present invention drive ram 30 and extend ram 30 considerably farther into composting chamber 20 than do the hydraulic cylinders 31 of the conventional composter. The stroke of ram 30 and the volume of evacuated space 50 may be varied according to the amount of organic matter to be composted. The force on the ram 30 may also be varied to control the density and porosity of the organic matter in the first part of the composting vessel, i.e. to control the density and porosity of the new charges which have occupied the evacuated space 50.

The control system 44' of the present invention controls the length of the stroke by controlling the amount of hydraulic fluid which is supplied to hydraulic cylinders 31' from hydraulic fluid supply source 46. When the stroke reaches the desired length, as determined, for example, by a preset pressure, control system 45 is deactuated in order to discontinue the supply of hydraulic fluid to hydraulic cylinders 31', thereby stopping the advancement of ram 30. This de-actuation of control system 44' may be done manually by an observer in visual contact with ram 30 or automatically by control system 44'.

The advancing of organic matter 36 results in a discharge of composted organic matter 36 from composting chamber 20 at outlet opening 28, which discharge involves an amount of organic matter 36 which is approximately equal to the volume of evacuated space 50. This discharge is ready for disposal or sale.

Once evacuated space 50 is cleared, new charging begins. Organic matter 36 is fed into the inlet zone 25 via inlet 22. Infeed conveyor 26 accomplishes this feeding. Next, ram 30 advances a first new charge of fed organic matter 36 through inlet zone 25 and evacuated space 50, and a preset density is achieved. At this point, the first new charge will be in contact with the mass of organic matter 36 already present in composting chamber 20. This area in which the new charge occupies the previously evacuated space 50 defines forming zone 60.

Ram 30 lightly compresses organic matter 36 within forming zone 60.

Next, ram 30 is partially or fully retracted to begin another charging step. A partial retraction of the ram 30 using multiple inlets 22a, 22b, 22c (FIGS. 1 and 3) or a moveable inlet 22' (FIG. 4) is the preferred approach, as will be described in more detail. Charging steps are performed when desired as organic matter 36 accumulates for composting. Each successive charging step requires ram 30 to be positioned a lessor distance downstream than the previous charging stop, since evacuated space 50 decreases with each charging step. Once evacuated space 50 is filled, and after a suitable delay, ram 30 once again is advanced against organic matter 36, thereby effecting a discharge of composted material via outfeed conveyor 29 and creating a new evacuated space 50. The distance which organic matter 36 is advanced may be the same as before or adjusted for different amounts or densities of organic matter 36 to be composted.

As previously indicated, wetness in the new charges of material occupying the previously evacuated space 50, which space 50, when filled, corresponds with forming zone 60, may create problems which compound themselves if the system of the present invention is not used. The relatively wet, new charges will tend to act like a fluid when they receive compressive force from the ram 30. This, in turn, causes the force to be transmitted in all directions against the walls of the composting chamber, much like hydraulic fluid in a cylinder. Without the use of the present invention, this transmission of ram force in all directions creates considerable frictional forces completely around the new charge, which, in turn, tends to cause the new charge to bind in the composting chamber.

In prior systems, where the only movement of organic matter through the chamber is movement of the entire mass of organic matter by pushing one new charge in the inlet zone against the remainder of the organic matter for stepwise movement through the composter, the binding of a relatively wet, new charge of organic matter in the chamber 20 creates a need for higher ram forces. The higher ram forces, in turn, increase the compaction of the organic matter near the ram, which only adds to the problems created by the wet material and which further inhibits reduction in the moisture content of the wet material by circulation of aeration air through the charge. The ever increasing forces required not only create a need for more powerful and stronger equipment but may also lead to serious equipment failures.

By the present invention, the compression of the new charges of relatively wet material in the forming zone 60 is carefully controlled so that the material does not become overly compacted and dense and so that aeration air may pass easily therethrough. This, in turn, results in the new charge of organic matter becoming dryer.

The passage of air through the new charges of relatively wet organic matter also results absorption of water by the aeration air, which in turn will cool the new charges. The cooling of the new charges ensures that the temperature of the charges will not exceed the maximum temperature (about 65 degrees Celsius) for optimal aerobic decomposition. Thus, control and adjustment of the compressive force applied to the new charges of organic matter by the ram 30 controls the temperature of the new charges to control and hasten the drying and composting process and to lead to attainment of a desireable degree of dryness.

Once sufficient dryness of the new charges is achieved, the charges will no longer act in the manner of a fluid when force is applied to the charges by the ram 30. When this state is reached, and the new charges behave as a solid, the force on the ram is transmitted generally longitudinally through the mass, thus minimizing friction between the mass and the walls of the composting chamber 20. At this point, the entire mass 36 is then readily moved through the composting chamber 20 to create a new evacuated space 50 near the inlet zone and to discharge a quantity of composted organic matter at the outlet.

Thus, with the system of the present invention, the entire mass 36 is first advanced by ram 30 to clear out evacuated space 50, the size of evacuated space 50 being variable and being such that, for any given charge, the size of space 50 may be adjusted from one percent to twenty percent of the length of the composting vessel. The size of evacuated space 50 is determined by the length of the stroke of the ram 30, which stroke may be varied for each different group of charges of new organic matter which enters the composting chamber through the inlet opening.

Once an evacuated space 50 of a selected size has been created, which size is selected such that new charges of organic matter of the proper density for composting will fit within the evacuated space 50, then the composing apparatus will be ready for further charging. A first new charge of organic matter with a known moisture content is introduced through the inlet opening. This first new charge is then moved by the ram into the evacuated space 50, which then becomes a forming zone 60. Additional new charges are then added. These new, relatively moist charges are then held in the forming zone for a period of time referred to as the holding stage until the charges become sufficiently dry, the dryness being effected by circulation of aeration air through the new charges and by the initial stages of the aerobic decomposition process. The targeted extent of dryness to be achieved before the entire mass of organic matter is to be moved through the composting chamber will generally fall within the range of 35% to 42% dry solids if the material to be composted is sewage sludge.

It is preferred that the relatively light compressive force on the new charges of organic matter in the forming zone 60 be maintained throughout the time when the new charges are held in the forming zone, i.e. during the holding stage. This is accomplished by maintaining the ram in position against the new charges under a relatively light force as the new charges are drying. The force on the ram may be adjusted during this holding period to maintain optimum conditions for reduction of moisture in the new charges.

During the holding period or holding stage, the moisture content of the new charges is preferably monitored on a regular basis. This may be accomplished by measuring the relative humidity of aeration air moving into and out of the new charges. From these measurements, the amount of moisture removed from the new charges may be derived. It will be known from an initial measurement of the moisture content of the organic matter fed into the composting apparatus, which measurement is made prior to the infeed operation, how much moisture must be removed to reach the optimum range of moisture content. Thus, the relative humidity measurements taken of the aeration air while the new charges are in the holding stage, coupled with the time factor, will provide an indication of when the new charges of organic matter have become dry enough for further processing.

Monitoring of the condition of the new charges may also be accomplished by monitoring the ram force (which is a function of the hydraulic pressure in cylinders 32) needed to maintain the ram in a given position during the holding stage of the new charges. The density of the new charges goes down as the moisture is removed from the charges. The density in the new charges, and thus their moisture content, may be gauged by pressure on the ram 30 needed to hold the ram in a given position. Conversely, if the ram 30 is allowed to move, the density of the material, and thus its moisture content, may be gauged by displacement of the ram during the holding stage when the pressure on the ram 30 is kept constant.

It will be understood that, once the new charges are sufficiently dry, i.e., once they contain 35%–42% dry solids if the material is sewage sludge, it is then possible to apply more pressure to the new charges without the deleterious effects of high ram pressure which will be encountered if the charges are relatively wet, i.e. if they contain less than 35% dry solids. As indicated, once the new charges are sufficiently dry, this increased pressure will be transmitted generally longitudinally throughout the entire mass 36 in the composting vessel, making it possible to readily move the entire mass to carry out the next stage of the composting process.

During day-to-day operations, the moisture content, i.e. the percentage of dry solids in the material to be composted, will vary. With prior horizontal composting systems, the variation in moisture content of the infeed material would result in different and uncontrollable porosities in the new charges. This, in turn, would adversely affect and render uncontrollable the air flows and pressure drops of aeration air passed through the new charges.

By controlling the density and porosity of the new charges in the present invention, flow of aeration air and pressure drop thereof is optimized. In turn, process control is readily achieved.

For example, where sewage sludge is the organic matter being composted, a density of 40 pounds per cubic foot at 35% dry solids results in a certain pressure drop in aeration air at a certain flow rate. When the density of the material is higher, for example, 60 pounds per cubic foot, the pressure drop for the aeration air is greater for the same material at the same moisture content of 35% dry solids and at the same flow rate. By the same token, the pressure drop of aeration air for a material at 45% dry solids and a density of 60 pounds per cubic feet at the same flow rate could be the same as in the first example of a density 40 pounds per cubic feet and 35% dry solids.

Thus, it is advantageous to optimize pressure drop at a given flow rate while density is controlled by moisture content of the charges. It will be apparent in this regard that pressure drop of the aeration air passing through the new charges during the holding stage is another parameter which may be monitored to determine the condition of the new charges, to ensure that the charges are being properly processed during the holding stage and to determine whether the charges are in a condition for further processing.

As indicated, the system of the present invention provides for the creation of an evacuated space 50 which is of substantially greater volume than the volume of the incremental inlet space 25, the incremental inlet space being the space being defined by the projection of the inlet opening into the composting chamber. This aids in the control over the density and drying of the new charges as already described in detail.

As also indicated, however, it is not necessary that the evacuated space 50 to be created by the advance of organic matter through the composting chamber 20 always be substantially greater than the volume of the incremental inlet space 25, even though the capability of creating an evacuated space of such substantially greater volume is indeed important. Thus, where only small amounts of organic matter need to be handled on a particular day, additional steps may be carried out which are different from the advancing and discharging steps previously described and in which a vacant space is created in the composting chamber which is not of substantially greater volume than the volume of the incremental inlet space. That is, for handling small amounts of organic material, it is advantageous for the system to impel an existing mass of organic matter already in the composting chamber toward the outlet opening to create a vacant space in the composting chamber, which vacant space is not of substantially greater volume than the volume of the incremental space. By the same token this will involve an expelling at the outlet opening of an amount of composted organic material corresponding with the amount of organic matter displaced by the impelling step, i.e. an amount of discharged matter which is not of substantially greater volume than the incremental inlet space. At this point, feeding of a new charge of organic material can be carried out in the usual manner, only that a small amount of charge will be used.

As already indicated briefly, where a large evacuated space 50 is to be created, alternatives for creating such a space other than a very long stroke of a ram are possible. For instance, an internal conveyor may be used instead of a ram 30. It is also desirable to provide a system in which it is not necessary to fully retract the ram 30, particularly when it is in a greatly extended position as shown in phantom lines in FIGS. 3 and 4. That is, provision is made to eliminate the need to fully retract ram 30 every time a new charge of material is to be added to the large evacuated space 50. In this regard, major stresses will be placed on the components which support and move ram 30 when the ram 30 is in considerably extended position as shown in phantom lines in FIGS. 3 and 4. This is particularly so when the ram 30 is then retracted, since disengagement of the ram from the organic matter 36 will mean that ram 30 is no longer supported in chamber 20 by organic matter 36. To reduce the stresses on these components when the ram is in such a position, the systems shown in FIGS. 3 and 4 provide for the introduction of new charges of organic matter into the evacuated space 50 without full retraction of the ram 30.

In the embodiments of FIGS. 1 and 3, this is accomplished by providing a plurality of inlet openings 22a, 22b, 22c with corresponding infeed conveyers 26a, 26b, 26c. Openings 22a, 22b, 22c are spaced from each other in the direction of the longitudinal axis 80 of composting vessel 12. In this way, new charges of organic matter may be fed through different inlet openings at different times to be deposited in different parts of the composting chamber 20.

Thus, referring to FIG. 3, ram 30 will be retracted to just before the upstream edge of inlet opening 22c after evacuated space 50 has been created. The area between the partially retracted ram 30 and the existing mass of organic matter already in chamber 20 will then be filled by an infeed operation. This new charge can be held and controlled to achieve desirable characteristics as already described, or the holding stage can come later. The ram can be then retracted further just beyond the upstream edge of inlet 22b, and the process can be repeated until evacuated space 50 is completely filled.

A system for selectively directing new charges of organic matter to the various inlet openings 22a, 22b, 22c via their corresponding infeed conveyers 26a, 26b, 26c is shown in FIG. 1. As shown, a supply conveyor 64 receives new organic material to be composted, which new organic matter flows in a direction shown by arrow 65. Supply conveyor 64 includes a pivoting segment 66 which may pivot in the direction shown by arrow 67. Of course, pivoting segment 66 may also pivot in the direction opposite to that shown by arrow 67, the pivoting movement taking place about the pivot axis 68. The various different positions which pivoting segment 65 may assume are shown in phantom lines in FIG. 1.

Supply conveyor 64, and in particular pivoting segment 66, is selectively connected with each of infeed conveyers 26a, 26b, 26c. These selective connections may be switched among the various infeed conveyers by the pivoting movement described. Thus, when the supply conveyor 64 is switched into one condition, such as that shown in solid lines in FIG. 1, it will feed organic matter to one of the infeed conveyers, i.e. infeed conveyor 26a as shown in FIG. 1. When supply conveyor 64 is then switched to another condition as shown by phantom lines in FIG. 1, supply conveyor 64 then feeds organic matter to another of the infeed conveyers 26b or 26c.

An alternate approach to feeding new charges of organic material into various different positions within a relatively large evacuated space 50 is shown in FIG. 4, which system utilizes a moveable inlet opening 22'. Inlet opening 22' is displaceable into various different positions along the longitudinal axis 80 of the composting vessel 12. Thus, various new charges of organic material may be fed into different parts of the composting chamber 20 at different times depending on the position of moveable inlet opening 22'.

Moveable inlet opening 22' is bordered by a sliding curtain 70 which will close those regions of the vessel 12 to which the moveable inlet opening 22' may be moved when curtain 70 is not located in such regions. In other words, the movability of the inlet opening 22' does not result in the top of vessel 12 being open over a substantial part of its length, and the sliding curtain 70 is what keeps the top of vessel 12 closed. Sliding curtain 70 may be made up of a series of flat horizontal slats 72 which provide flexibility to curtain 70 such that its ends may roll up into or roll out from cylindrical housings 74 as the moveable inlet opening 22' is moved from one position to another.

The operation of the system shown in FIG. 4 is similar to that of the multiple outlet opening system of FIGS. 1 and 3. When a large evacuated space 50 has been created as shown, moveable inlet opening 22' may be moved relatively far downstream as shown in FIG.

4. Ram 30 may be retracted to assume a position on the upstream side of inlet opening 22', at which time a new charge of organic matter may be introduced through inlet opening 22' into the part of the evacuated space 50 located upstream of the ram 30. A light compressive force may then be applied to this new charge in the manner previously described. Either before or after a holding period for that new charge, additional new charges may be added to the evacuated space 50 by partially retracting both the moveable inlet 22' and the ram 30. This process may then be repeated until evacuated space 50 is filled.

Although the invention has been described with reference to a set of specific exemplary embodiments, it is to be understood that many modifications, variations and equivalents are possible within the spirit and scope of the invention as defined in the appended claims.

What is claimed is:

1. A method for the continuous aerobic composting of a mass of organic matter in an elongated composting vessel, the vessel including an internal composting chamber which contains the mass, an inlet opening adjacent one end of the chamber, which inlet opening, when projected into the composting chamber, defines an incremental inlet space in the composting chamber, and an outlet opening adjacent the other end of the composting chamber for discharging of composted organic matter, the method comprising the steps of:

advancing a mass of organic matter through the composting chamber toward the outlet opening to create an evacuated space in the composting chamber, which evacuated space is of substantially greater volume than the volume of said incremental inlet space;

discharging through the outlet opening an amount of composted organic matter corresponding with the amount of organic matter displaced by said advancing step, which amount of discharged organic matter is of substantially greater volume than the volume of said incremental inlet space;

feeding through the inlet opening a new charge of organic matter;

moving the new charge of organic matter into the evacuated space in the composting chamber to join the existing mass of organic matter already in the composting chamber; and compressing the new charge of organic matter so as to provide a given density and porosity in the new charge wherein said compressing step is accomplished without moving the existing mass of organic matter already in the composting chamber.

2. A method as defined in claim 1, wherein said advancing step includes advancing the mass of organic matter a distance which creates an evacuated space which runs from one percent to twenty percent the length of the vessel.

3. A method as defined in claim 1, wherein the composting chamber includes a moveable ram therein and wherein said advancing and discharging steps are effected by a first displacement of a ram in the composting chamber in a direction from the inlet opening toward the outlet opening and wherein said moving step is effected by a second displacement of the ram toward the outlet opening, which second displacement is separate from and subsequent to the first displacement and which second displacement follows a retraction of the ram to permit the new charge of organic matter to be deposited in front of the ram by the feeding step.

4. A method as defined in claim 1, wherein said compressing step includes maintaining said compression on the new charge of organic matter in the forming zone to control the moisture content of the new charge of organic matter.

* * * * *

UNITED STATES PATENT AND TRADEMARK OFFICE
CERTIFICATE OF CORRECTION

PATENT NO. : 5,076,827

DATED : Dec. 31, 1991

INVENTOR(S) : Richard P. Johnson

It is certified that error appears in the above-identified patent and that said Letters Patent is hereby corrected as shown below:

Column 10, line 60, "results absorption" should read --results in the absorption--.

Signed and Sealed this

Thirty-first Day of August, 1993

Attest:

BRUCE LEHMAN

Attesting Officer    Commissioner of Patents and Trademarks